United States Patent Office 3,071,480
Patented Jan. 1, 1963

3,071,480
GLASS COMPOSITION FOR BEADS
Charles E. Searight and Ezra M. Alexander, Jackson, Miss., assignors to Cataphote Corporation, Toledo, Ohio, a corporation of Ohio
No Drawing. Filed Dec. 5, 1960, Ser. No. 73,512
4 Claims. (Cl. 106—52)

This invention relates to an improved glass composition and, more particularly, to a glass composition suitable for the manufacture of solid spherical glass beads.

In the manufacture of glass beads for use in reflective road signs, reflective road and curve markings, and the like, it is of paramount importance that the glass composition meet certain rigid requirements, both as to chemical and physical characteristics. Among the characteristics which the glass composition must exhibit, the following are particularly important: relatively low viscosity and high surface tension of the molten material to be readily spherulized when properly treated. Other desirable characteristics include hardness, structural stability, and resistance to erosion and deterioration by atmospheric conditions.

It is known in the glass-making art that a soda-lime silica glass will provide the necessary physical and chemical properties for the manufacture of glass beads by the customary bead-making processes.

The disadvantage of soda-lime glass for use in the manufacture of glass beads is that it is extremely difficult to make the beads spherical, due to the relatively high viscosity and relatively low surface tension of this particular type of glass composition. Among the other disadvantages of soda-lime glass in the manufacture of glass beads is that a large amount of free alkali is present on the surface of the resultant beads which causes severe deterioration under extreme exposure conditions. Still a further disadvantage of soda-lime glass is its tendency to form bubbles or gas inclusions within the beads while they are being spherulized.

It is an object of this invention to produce a glass composition which is especially suitable for the manufacture of glass beads of a general refractive index of 1.50 to 1.60, which is capable of withstanding severe exposure conditions, which may be spherulized readily, which has a reduced tendency to form bubbles or gas inclusions, and which is economical, both as to raw materials and melting costs.

These and other objects and advantages of the invention are realized in a glass composition generally comprising from 60% to about 68% $SiO_2$; from about 12.7% to about 16% $Na_2O$; from about 12.7% to about 16% CaO; from 5.9% to 7.3% BaO; and about 0.7% fluoride (calculated as $F_2$).

In order to provide suitable durability to the resultant glass upon exposure, the greatest amount of silicon dioxide ($SiO_2$) possible is desirable and in no case should this content be less than 60% by weight. Other ingredients which are then added to the silicon dioxide must not detract from the durability factor but should lower the viscosity and raise the surface tension of the silicon dioxide. There are several glass compositions produced today which, although they possess many of the characteristics required for the manufacture of glass beads, also embody certain rare metallic oxides which render production of low-cost glass spheres or beads uneconomical.

In the preferred embodiment of the invention we take 65% by weight (66.9 mol percent) silicon dioxide, which actually can be modified as to proportion within the range of approximately 60% by weight (62.1 mol percent) to 68% by weight (69.9 mol percent) and to this we add basically three ingredients; these three ingredients being sodium oxide in a preferred quantity of 14% by weight (14 mol percent) but which may range in quantity from approximately 12.7% by weight (12.7 mol percent) to 16% by weight (16 mol percent), calcium oxide in a preferred quantity of 14% by weight (15.5 mol percent), but which may range in quantity from 12.7% by weight (14.0 mol percent) to 16% by weight (17.7 mol percent), and barium oxide in a preferred quantity of 6.3% by weight (2.5 mol percent), but which may range in quantity from 5.9% by weight (2.3 mol percent) to 7.3% by weight (3.0 mol percent). Fluoride is preferred as a flux and fining agent in the preferred quantity of 0.7% by weight (1.1 mol percent), calculated as $F_2$.

The various materials or constituents added to the silicon dioxide as mentioned above have the following functional characteristics. The sodium oxide content acts as an excellent melting agent of flux for the glass and also decreases the viscosity thereof. If the sodium oxide were allowed to be leached from the resultant glass, a serious problem of deterioration of the same would be caused.

The calcium oxide content increases the viscosity at a particular temperature, but has a relatively small effect on the viscosity compared to other metallic oxides such as magnesium oxide and aluminum oxide. The calcium oxide makes a faster setting glass; that is, enables the glass to cool quicker and also imparts weatherability characteristics to the glass which includes the chemical resistance. Further, the calcium oxide aids in producing a harder glass by increasing the resistance of the glass to leaching by water by combination with sodium oxide. Also, the calcium oxide increases the density of the soda-lime glass, and therefore the refractive index thereof.

The addition of the barium oxide to the composition increases the refractive index of the resultant glass, increases density, reduces viscosity especially at high temperature, imparts excellent optical properties to the resultant glass, and increases its chemical resistance (the resistance to leaching of the glass).

The addition of the fluoride content has a great tendency to flux refractories in amounts of 2% and up. Also, in an amount of 4% to 5% and up the fluorides will precipitate out of the glass on cooling and, therefore, will make an opalescent glass. The fluoride is an excellent fluxing and fining agent and decreases the viscosity of the glass in very small percentage.

The resultant glass composition incorporates all of the desired physical conditions for a glass bead and also may be spherulized readily without the danger of air inclusions which are normally caused by high viscosity.

Examples of the glass compositions manufactured in accordance with the principles of the present invention are as follows:

Example 1

According to the preferred embodiment of the invention, the glass composition comprises the following ingredients:

| | Percent |
|---|---|
| Silicon dioxide ($SiO_2$) | 65 |
| Sodium oxide ($Na_2O$) | 14 |
| Calcium oxide (CaO) | 14 |
| Barium oxide (BaO) | 6.3 |
| Fluoride (calculated as $F_2$) | 0.7 |

Example 2

In a modified embodiment of the invention, the glass composition comprises the following ingredients:

| | Percent |
|---|---|
| Silicon dioxide ($SiO_2$) | 60 |
| Sodium oxide ($Na_2O$) | 16 |
| Calcium oxide (CaO) | 16 |
| Barium oxide (BaO) | 7.3 |
| Fluoride (calculated a $F_2$) | 0.7 |

Example 3

In another modified embodiment of the invention, the glass composition comprises the following ingredients:

| | Percent |
|---|---|
| Silicon dioxide ($SiO_2$) | 68 |
| Sodium oxide ($Na_2O$) | 12.7 |
| Calcium oxide (CaO) | 12.7 |
| Barium oxide (BaO) | 5.9 |
| Fluoride (calculated as $F_2$) | 0.7 |

In the manufacture of glass beads from the glass compositions mentioned hereinabove, one conventional method is to fragmentize manufactured glass and then introduce the powdered glass into a stream of heated gases to soften the glass sufficiently to enable surface tension to spherulize the particles. This method of producing small macroscopic glass beads is illustrated and described in U.S. Patent 2,730,841, dated January 17, 1956, and entitled "Production of Silicon-Coated Glass Beads."

According to the provisions of the patent statutes, we have explained the principles of our invention, and have described what we now consider to represent its best embodiment. However, we desire to have it understood that, within the scope of the appended claims, the invention may be practiced otherwise than specifically described.

We claim:

1. A glass for use in the manufacture of beads and the like consisting essentially of from about 60% to about 68% by weight silicon dioxide, from about 12% to about 16% by weight sodium oxide, from about 12% to about 16% by weight calcium oxide; from about 5% to about 8% by weight barium oxide.

2. A glass of the character described consisting essentially of 65% silicon dioxide, 14% sodium oxide, 14% calcium oxide, 6.3% barium oxide, and about 0.7% fluoride calculated as $F_2$, all percentages by weight.

3. A glass of the character described consisting essentially of 60% silicon dioxide, 16% sodium oxide, 16% calcium oxide, 7.3% barium oxide, and about 0.7% fluoride calcium calculated as $F_2$., all percentages by weight.

4. A glass of the character described consisting essentially of 68% silicon dioxide, 12.7% sodium oxide, 12.7% calcium oxide, 5.9% barium oxide, and about 0.7% fluoride calculated as $F_2$., all percentages by weight.

References Cited in the file of this patent

UNITED STATES PATENTS 1,962,496     Fisher _____ June 12, 1934

OTHER REFERENCES

Glastechnishche Tabellen, by Eitel et al., 1934, pages 604, 605 and 655.